E. GALAVAN.
ILLUMINATED LIQUID CONTAINER.
APPLICATION FILED SEPT. 27, 1918.
1,389,132.
Patented Aug. 30, 1921.
2 SHEETS—SHEET 1.
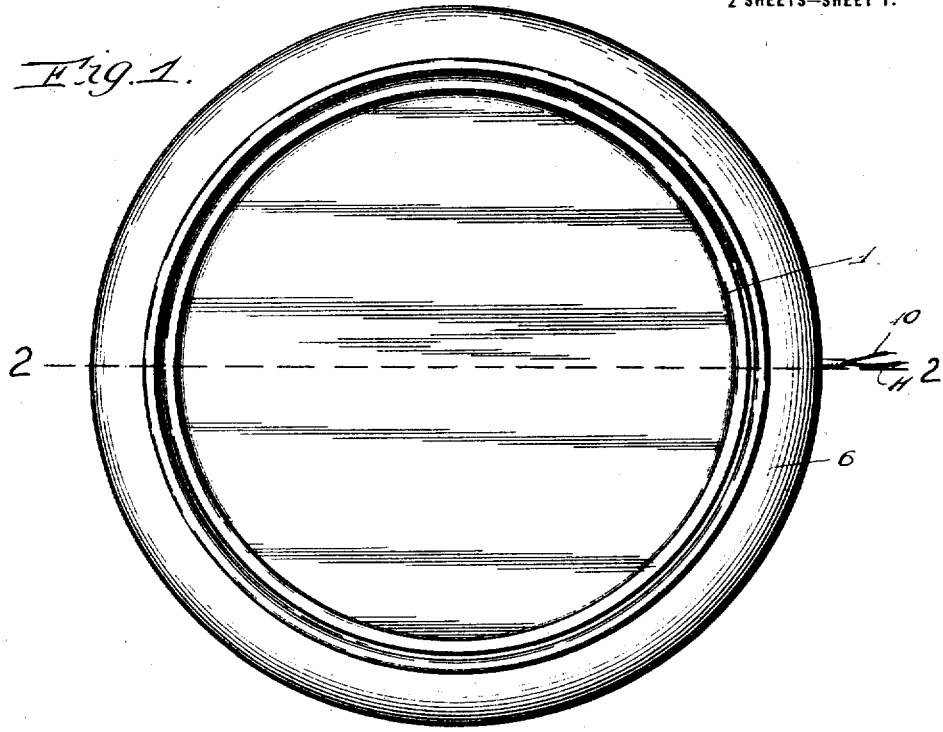
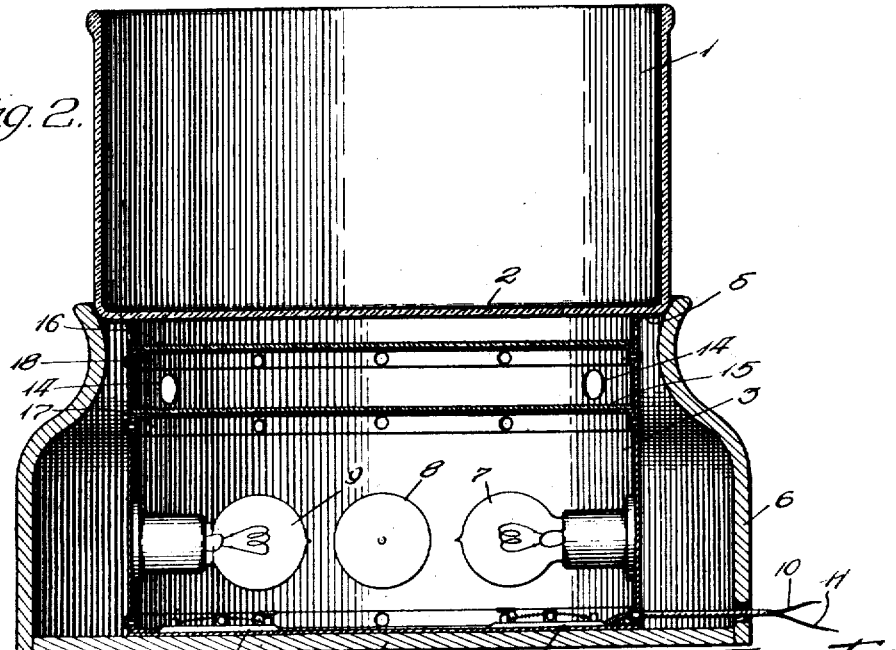
Witness:
Blanche Chalmers.
Inventor
Edward Galavan
By Burton & Hills Atty.

E. GALAVAN.
ILLUMINATED LIQUID CONTAINER.
APPLICATION FILED SEPT. 27, 1918.
1,389,132.  Patented Aug. 30, 1921.
2 SHEETS—SHEET 2.
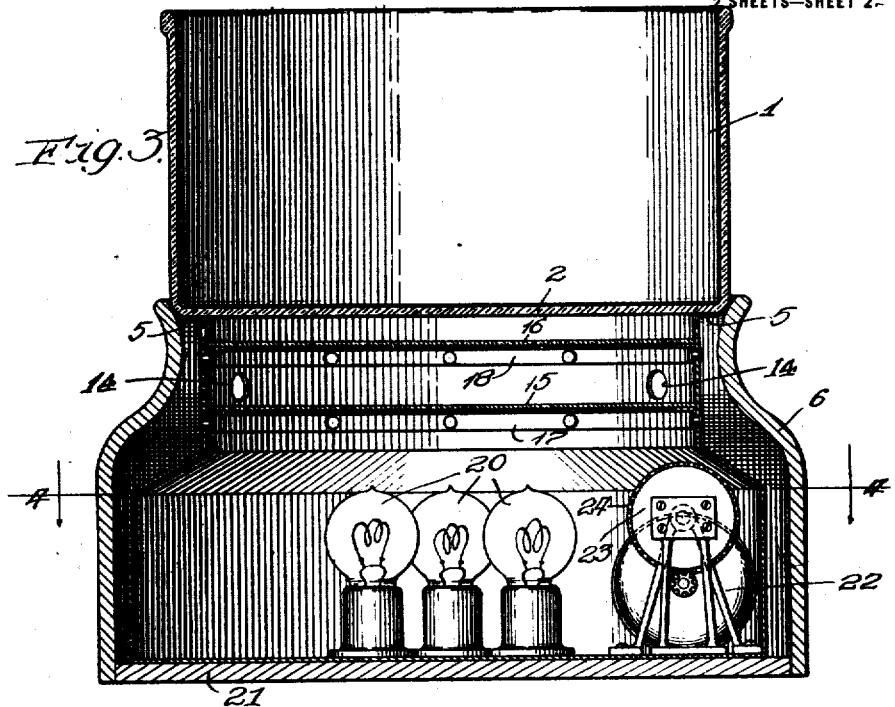
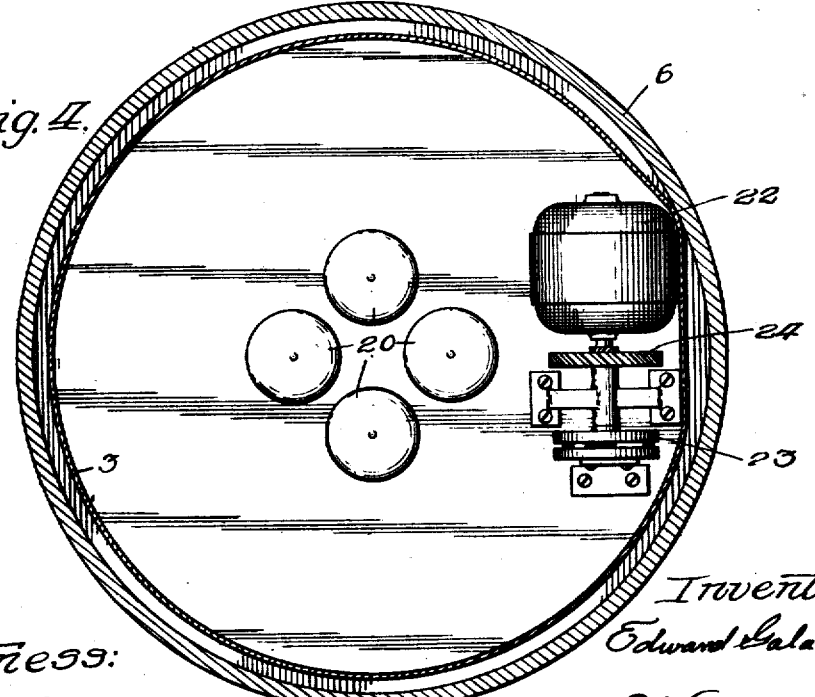

UNITED STATES PATENT OFFICE.

EDWARD GALAVAN, OF CHICAGO, ILLINOIS, ASSIGNOR TO A. L. RANDALL CO., OF CHICAGO, ILLINOIS, A CORPORATION OF ILLINOIS.

ILLUMINATED LIQUID-CONTAINER.

1,389,132.      Specification of Letters Patent.      Patented Aug. 30, 1921.

Application filed September 27, 1918. Serial No. 255,963.

*To all whom it may concern:*

Be it known that I, EDWARD GALAVAN, a citizen of the United States, residing at Chicago, in the county of Cook and State of Illinois, have invented certain new and useful Improvements in an Illuminated Liquid-Container, of which the following is a description.

My invention relates to lighting and decorating devices and especially to an aquarium or other liquid container having its contents illuminated with various colored light.

The object of my invention is to produce a simple, convenient and inexpensive device of the kind described whereby the contents of an aquarium or other liquid container may be illuminated and the color of the light employed automatically changed at frequent intervals to produce a more pleasing effect.

To this end my invention consists in the novel construction, arrangement and combination of parts herein shown and described and more particularly pointed out in the claims.

In the accompanying drawings wherein like or similar reference characters indicate like or corresponding parts:

Figure 1 is a plan view of my device.

Fig. 2 is a section taken substantially on line 2—2 of Fig. 1.

Fig. 3 is a view similar to Fig. 2 but showing a slightly modified form of illuminating mechanism.

Fig. 4 is a section taken substantially on line 4—4 of Fig. 3.

In the form shown in the drawings, 1 is a liquid container having its sides formed of any suitable material but with the bottom 2 formed of glass or other suitable substance pervious to light. 3 is a frame formed of sheet metal or other suitable material resting upon a base 4 and provided with a flange or other convenient means at its upper end to receive the bottom of the container 1 to support the same in position.

In the preferred construction the margins of the base 4 projects beyond the sides of the frame 3 and is rigidly attached at its periphery to a screen 6 preferably formed of woven material or otherwise arranged to permit the passage of air therethrough but substantially impervious to light. The screen 6 extends from the base 4 upward to the lower margin of the container 1 and coöperates with the pervious wall 2 thereof to direct the light from the illuminating mechanism within the frame 3 to the pervious wall and to prevent its radiation in any other direction. The screen 6 may be ornamented in any suitable manner to provide a pleasing exterior for the base or supporting means of the container.

Any suitable means may be provided to produce the illumination desired. In the form shown a plurality of electric lights 7, 8 and 9 are provided within the frame 1 and rigidly attached to the walls or other suitable parts thereof, each connected by the electric conductors 10 and 11 to a suitable source of electric energy for operating the same. An automatic switch or flasher 12 is also provided to each lamp adapted to periodically open and close the circuit thereto thus intermittently extinguishing and relighting each lamp so that when the electric circuit is closed through the conductors 10 and 11 the lamps 7, 8 and 9 will each operate intermittently. In the preferred construction each of the lamps are of a different color preferably red, yellow and blue or other strongly contrasting colors each adapted to operate to produce a pleasing color effect alone or in combination with either or both of the others. The several flashers are preferably constructed to operate at slightly different intervals so that at times, each lamp will be operated alone and at other times will be operating in combination with each of the other lamps thus producing more or less irregular variations in the colors of the light produced.

In the preferred construction a plurality of apertures 14—14 are provided in the upper portion of the frame 3 to permit the free circulation of air through the frame between the bottom 2 of the container 1 and the lamps to dissipate the heat produced when they are lighted. Screens 15 and 16 are also preferably provided between the container 1 and lamps adapted to assist in preventing the direct passage of heat from the lamps to the container.

In the preferred construction the screen 15 is formed of translucent glass or other suitable material loosely resting upon a shelf or bracket 17 on the inner wall of the frame 3 adapted to diffuse the light passing through it while the screen 16 also loosely resting upon a bracket 18 of the frame 3 may be of clear glass or other material which may if desired be ornamented or otherwise arranged to produce any desired effect upon the light passing through it. The several apertures 14—14 are preferably so arranged as to permit air to pass between the screens 15 and 16 and also between the screen 16 and bottom 2 of the container and under ordinary circumstances this arrangement has been found in practice sufficient to entirely dissipate the heat produced by the lamps without perceptibly warming the liquid in the container 1.

In the form shown in Fig. 3, the lights 20 are mounted directly upon the base 21 corresponding to the base 4 in the form herein before described and a motor 22 having a commutator 23 connected by suitable gearing as at 24 to its shaft to operate the commutator is provided to control the electric circuit to the several lamps so as to successively light and extinguish each lamp at any desired interval and produce any predetermined color effect desired.

After thus describing my invention, it is obvious that various immaterial modifications may be made without departing from the spirit of my invention, hence I do not wish to be understood as limiting myself to the exact form of construction shown, other than as is expressed in the claims.

What I claim as new and desire to secure by Letters Patent is:

1. In a device of the kind described, a liquid container provided with an inclosing wall pervious to light and a supporting member for said container provided with a wall impervious to light and arranged to support the container in an elevated position, in combination with a plurality of different colored lights arranged beneath the container, means for automatically lighting said members, and air chambers arranged between the lights and the bottom of the container.

2. In a device of the kind described, a liquid container provided with an inclosing wall pervious to light and a supporting member for said container provided with a wall impervious to light and arranged to support the container in an elevated position, in combination with a plurality of different colored lights arranged beneath the container, means for automatically operating said lighting members and a plurality of air chambers arranged between the lighting members and the bottom of the container.

In testimony whereof, I have hereunto signed my name in the presence of two subscribing witnesses.

EDWARD GALAVAN.

Witnesses:
BURTON U. HILLS,
BLANCHE CHALMERS.